US005158837A

United States Patent [19]
Misawa et al.

[11] Patent Number: 5,158,837
[45] Date of Patent: Oct. 27, 1992

[54] SOLID OXIDE FUEL CELLS

[75] Inventors: Hidenobu Misawa, Toyoake; Hirotake Yamada, Nagoya, both of Japan

[73] Assignee: NGK Insulators, Ltd., Japan

[21] Appl. No.: 651,799

[22] Filed: Feb. 7, 1991

[30] Foreign Application Priority Data

| Feb. 15, 1990 [JP] | Japan | 2-32383 |
| Mar. 27, 1990 [JP] | Japan | 2-75601 |
| Mar. 28, 1990 [JP] | Japan | 2-76710 |

[51] Int. Cl.$^5$ .............................. H01M 2/00
[52] U.S. Cl. ...................... 429/34; 429/12; 429/27; 429/30; 429/38
[58] Field of Search ............ 429/12, 27, 30, 34, 429/38, 209

[56] References Cited

U.S. PATENT DOCUMENTS

| 3,359,134 | 12/1967 | Salvadori et al. | 136/38 |
| 4,463,067 | 7/1984 | Feigenbaum | 429/38 |
| 4,522,895 | 6/1985 | Shigeta et al. | 429/34 |
| 4,666,755 | 5/1987 | Shigeta et al. | 429/34 |
| 4,751,152 | 6/1988 | Zymboly | 429/34 |

FOREIGN PATENT DOCUMENTS

| 0055011 | 6/1982 | European Pat. Off. . |
| 0242201 | 10/1987 | European Pat. Off. . |
| 0286360 | 10/1988 | European Pat. Off. . |
| 0376579 | 7/1990 | European Pat. Off. . |

Primary Examiner—William R. Dixon, Jr.
Assistant Examiner—Willie J. Thompson
Attorney, Agent, or Firm—Parkhurst, Wendel & Rossi

[57] ABSTRACT

A solid oxide fuel cell including a bottomprovided cylindrical solid oxide fuel cell element including at least an air electrode, a solid electrolyte and a fuel electrode, a gas feed pipe inserted into a cylindrical space and having a gas feeding portion for feeding an oxidizing gas or a fuel gas into the cylindrical space of the solid oxide fuel cell element. The gas feeding portion is provided at least in a lateral face of the gas feed pipe. Instead of or in addition to the gas feeding portion being provided in the lateral face of the gas feed pipe, a permeating amount of the gas passing through that portion of the porous cylindrical support tube which faces an upstream side of a stream of the gas flowing through the cylindrical space is made smaller than that of the gas passing through that portion of the porous cylindrical support tube which faces a downstream side of the gas stream.

18 Claims, 10 Drawing Sheets

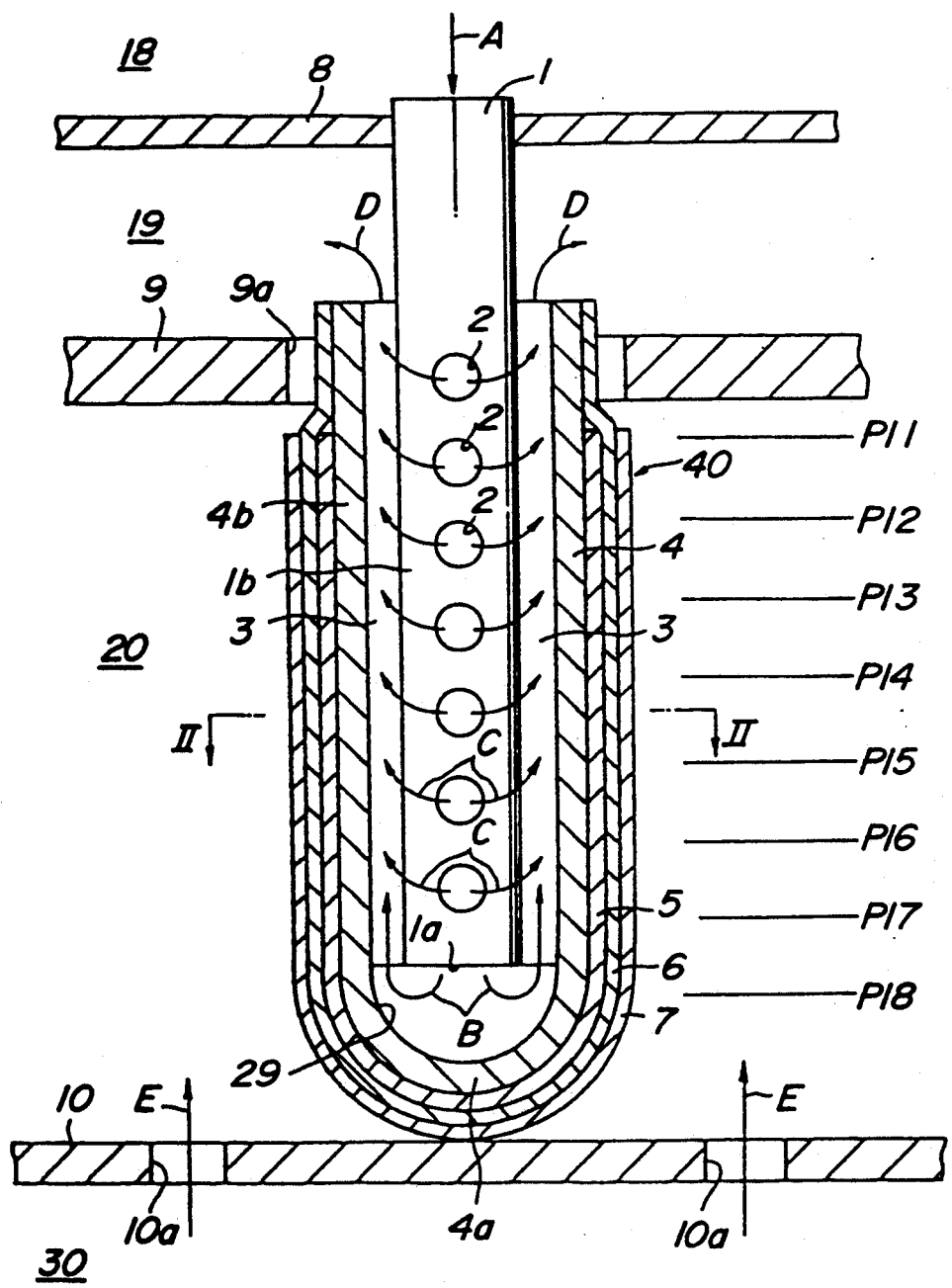
FIG_1

FIG_2
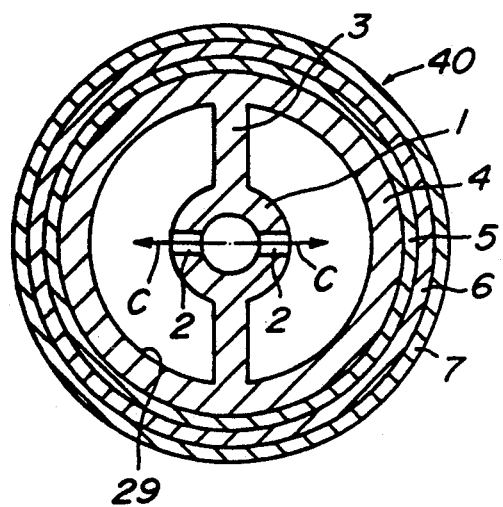
FIG_3
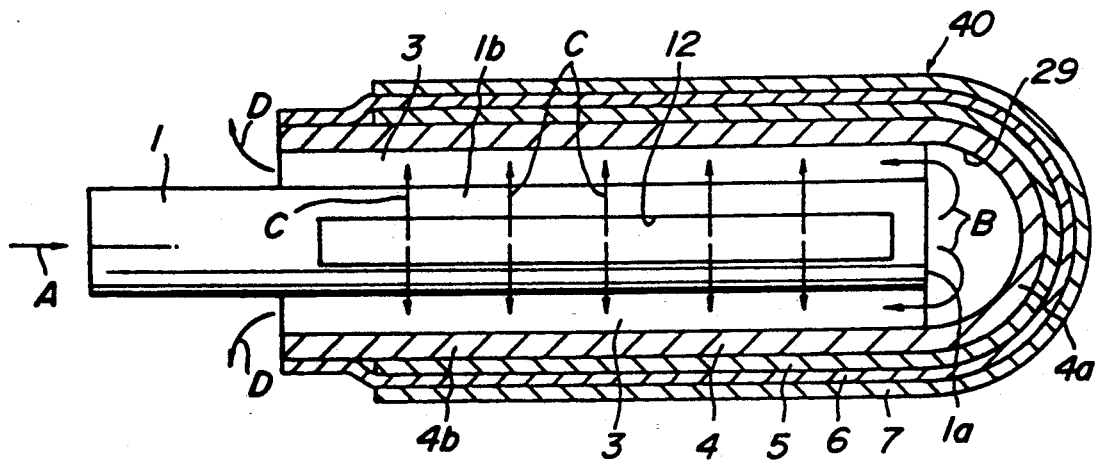

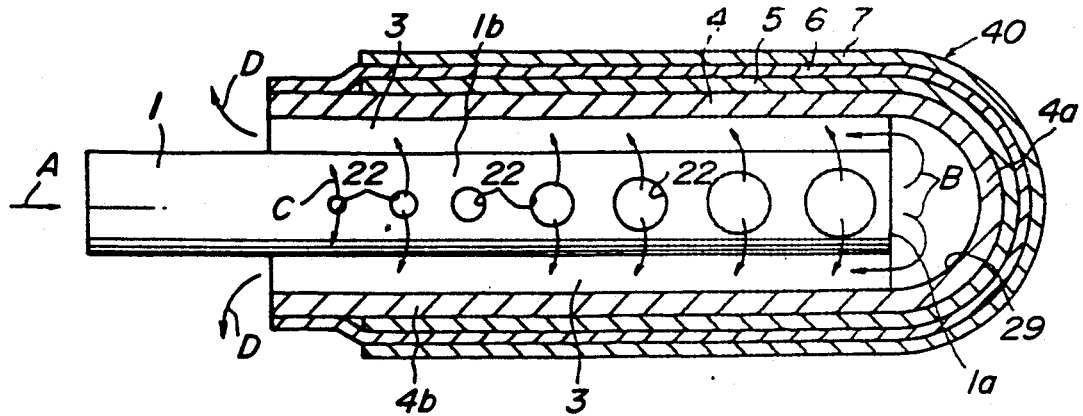
FIG._4
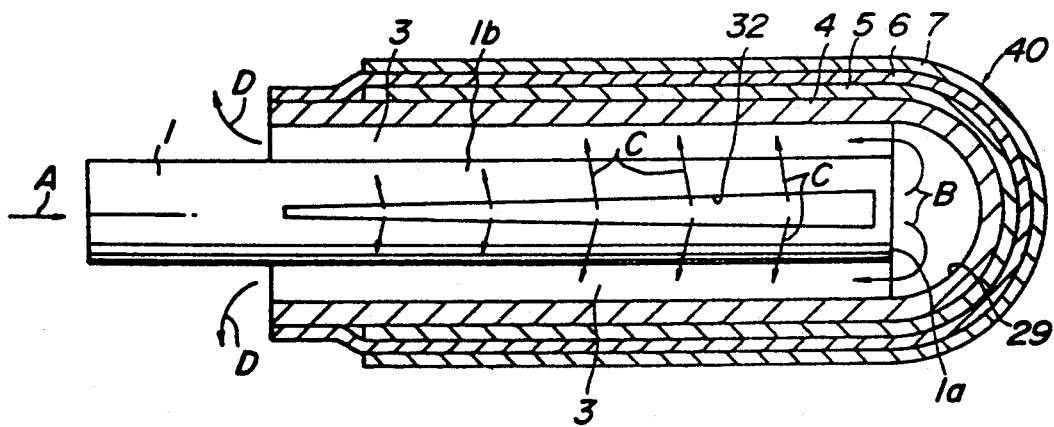
FIG._5

FIG_6
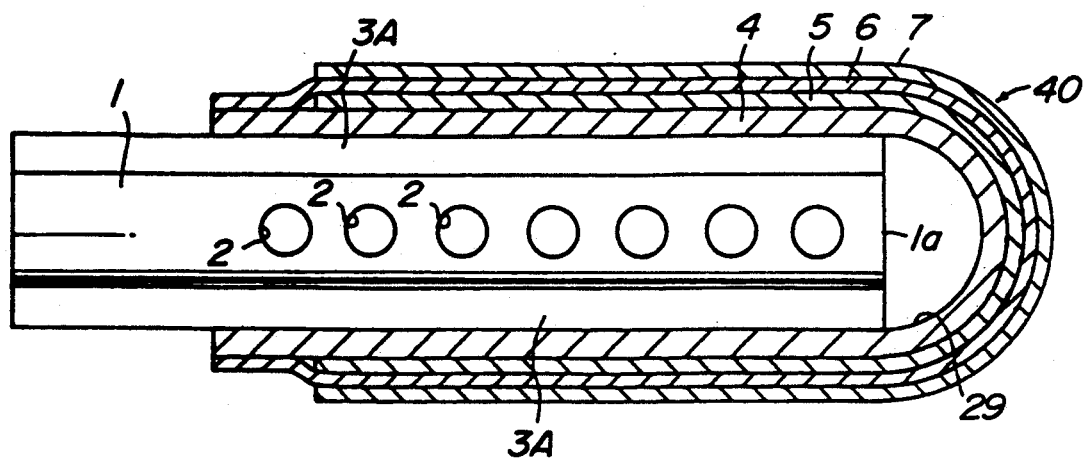
FIG_7
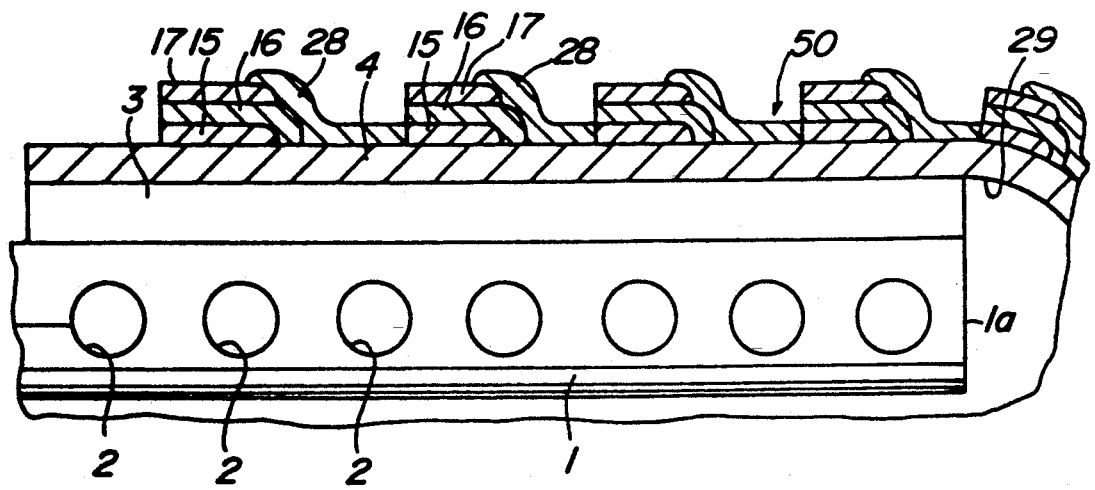

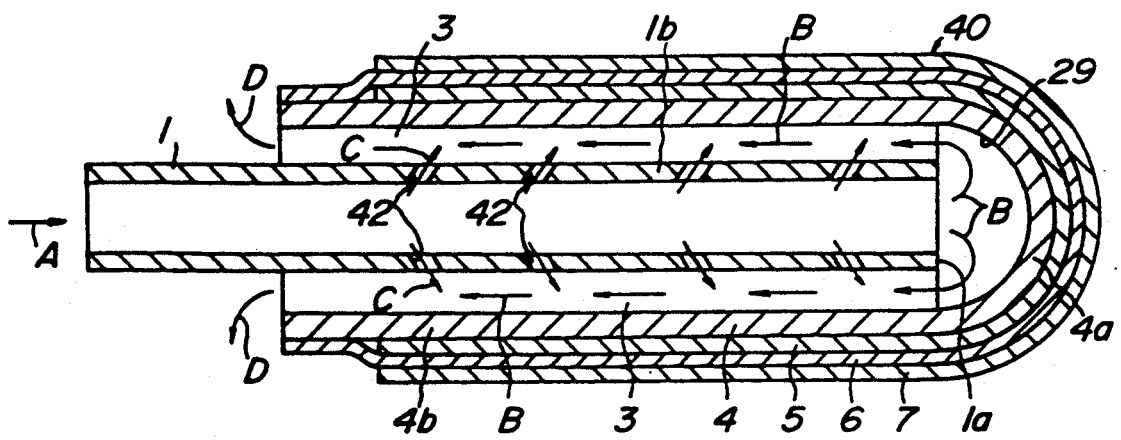
FIG_8

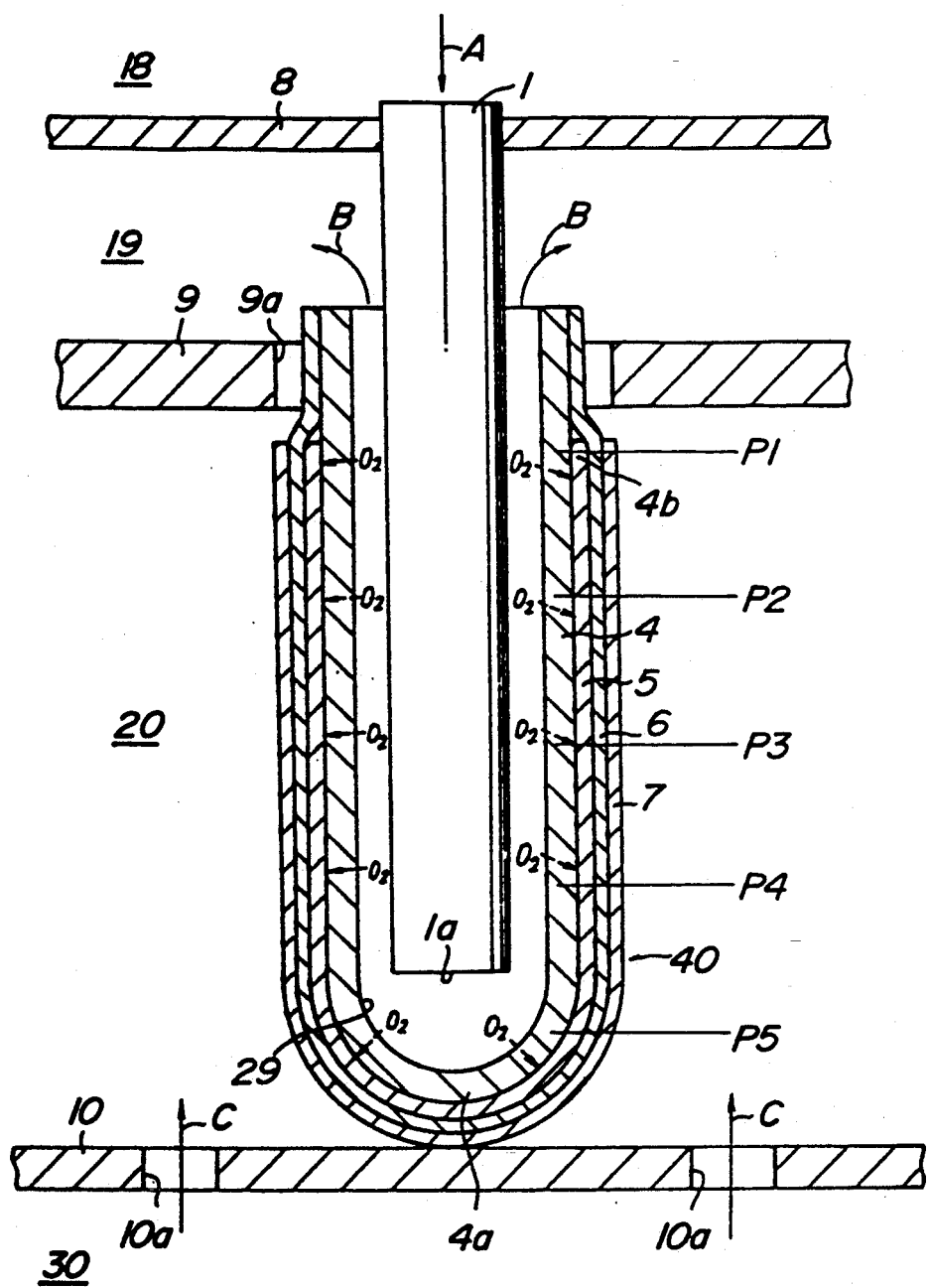

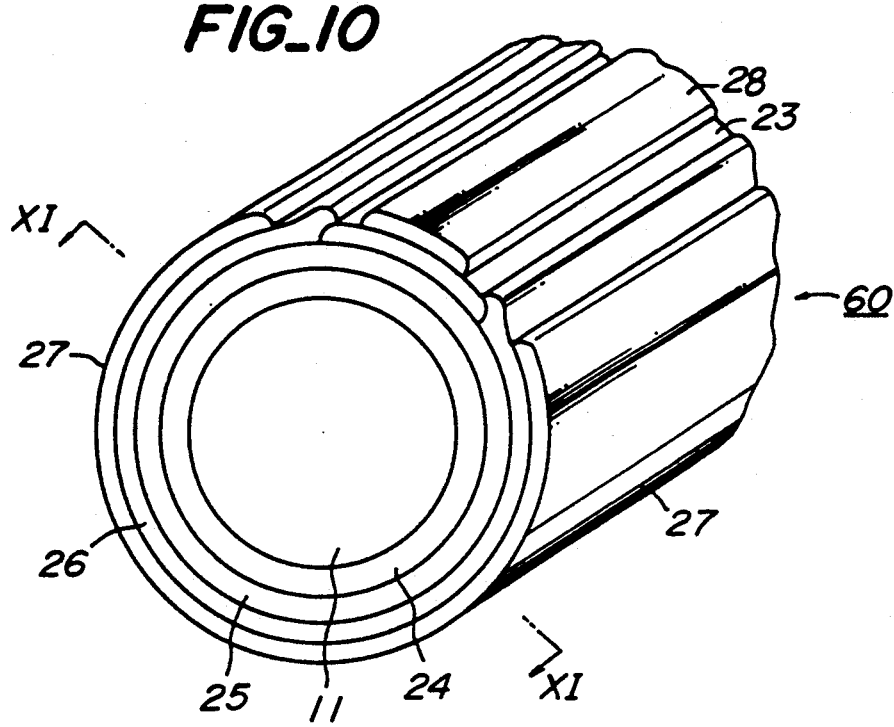
FIG_10
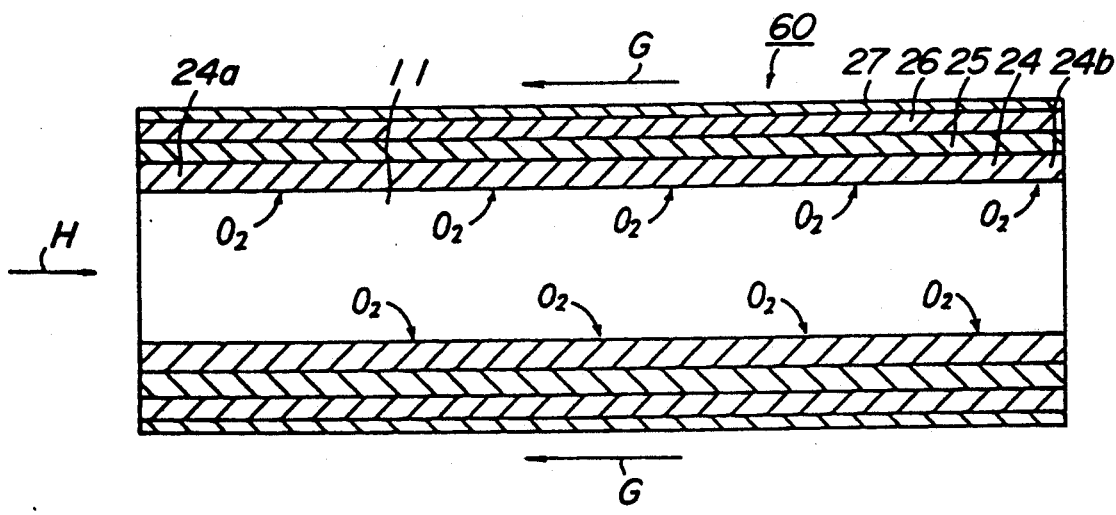
FIG_11

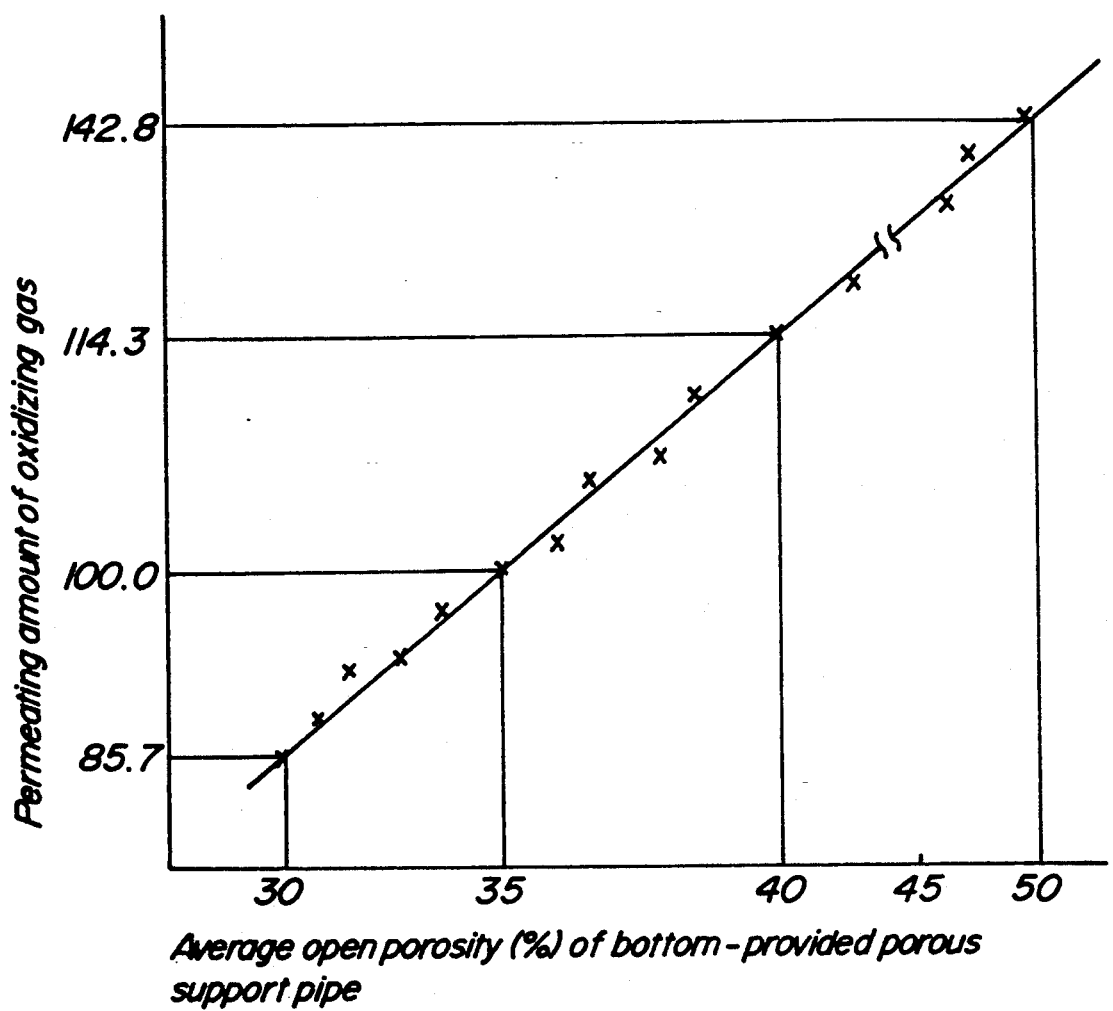
FIG_12

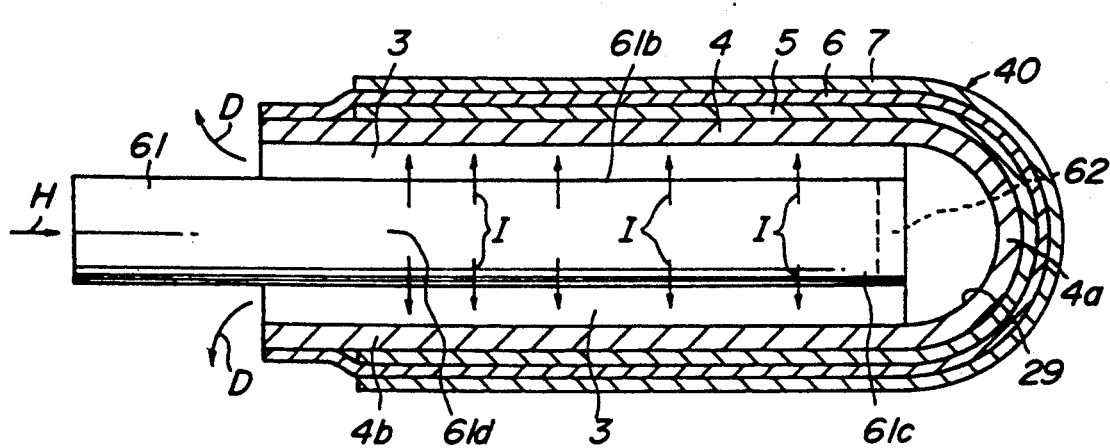
FIG_13

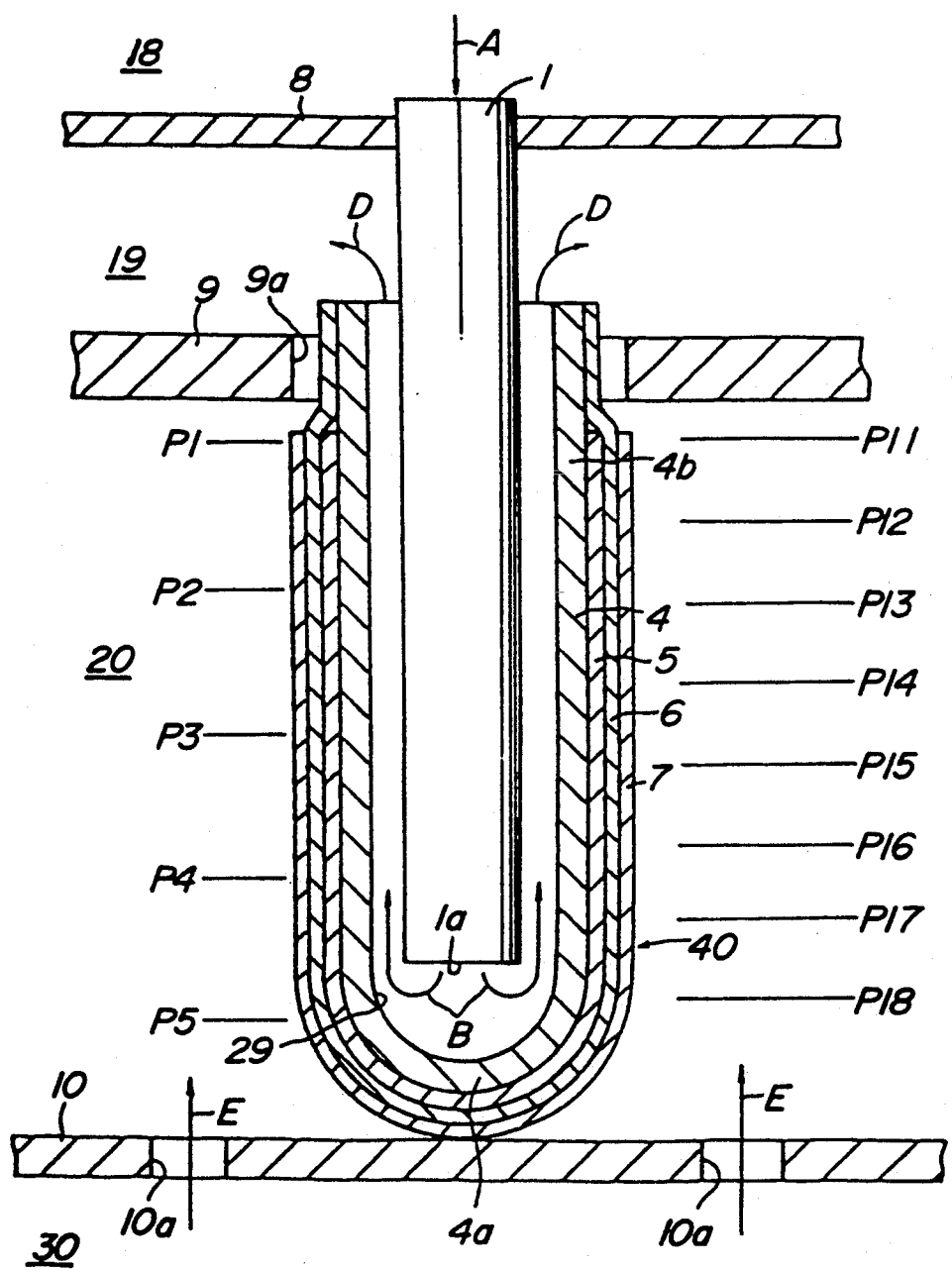
FIG_14

SOLID OXIDE FUEL CELLS

BACKGROUND OF THE INVENTION

1. Field of the Invention

The present invention relates to solid oxide fuel cells.

Recently, fuel cells have been recognized as power generating equipment. Since the fuel cell is a device capable of directly converting chemical energy possessed by fuel to electrical energy and the fuel cell is free from any limitation of Carnot's cycle, the cell is an extremely promising technique in that the fuel cell essentially has a high energy conversion efficiency, a variety of fuels (naphtha, natural gas, methanol, coal reformed gas, heavy oil, etc.) may be used, the cell provokes less public nuisance, and its power generating efficiency is not influenced by the scale of the equipment.

2. Related Art Statement

Particularly, since the solid oxide fuel cell (SOFC) operates at high temperatures of 1,000° C. or more, reaction on the electrode is extremely active. Thus, no catalyst of a noble metal such as expensive platinum is necessary. In addition, since the SOFC has low polarization and relatively high output voltage, its energy conversion efficiency is conspicuously higher than that of other fuel cells. Furthermore, since their constituent materials are all solid, SOFC is stable and has long use life.

FIG. 14 is a schematic sectional view illustrating an example of such an SOFC.

In FIG. 14, reference numerals 1, 4, 5 and 6 are an oxidizing gas feed pipe for the introduction of an oxidizing gas such as air, a bottom-provided porous support tube, an air electrode, and a solid electrolyte, respectively. Reference numerals 7, 8, 9 and 10 are a fuel electrode, an upper plate for holding the oxidizing gas feed pipe 1 and separating an oxidizing gas chamber 18 from an exhaust gas chamber 19, a plate having a gas outflow hole 9a an separating the exhaust gas chamber 19 from a fuel reacting chamber 20, and a bottom plate provided with fuel inflow holes 10a and adapted for holding an SOFC element 40 and separating a cell reacting chamber 20 and a fuel chamber 30, respectively.

In this state, when the oxidizing gas such as air is fed from the oxidizing chamber 18 to the oxidizing gas feed pipe 1 as shown by an arrow A, the oxidizing gas flowing out through an oxidizing gas feed opening 1a is inverted at a bottom portion 4a (arrows B), flows through a space 29 inside the bottom-provided cylindrical porous support tube 4, and is discharged out to the exhaust gas chamber 19 as shown by an arrow D. On the other hand, when a fuel gas such as $H_2$ or $CH_4$ flows along the outer surface of the SOFC element 40 through the fuel inflow openings 10a of the bottom plate 10, the fuel gas reacts with oxygen ions diffusing out through the solid electrolyte on the surface of the fuel electrode 7. As a result, current flows between the air electrode 5 and the fuel electrode 7, so that the SOFC can be used as a cell. Since this fuel cell is used at high temperatures such as around 1,000° C., it is preferably used in the construction of FIG. 14 which needs no sealed portion.

In order to put the SOFC into practical use, it is necessary that costs are reduced, and electrical power density is increased. For this reason, it is required that the length of the SOFC element 40 is increased and that the power generation output per element is increased.

However, when the bottom-provided tubular SOFC element 40 is prolonged the temperature gradient becomes greater owing to non-uniform reactivity on the electrode in the longitudinal direction of the SOFC element 40, so that thermal strain and stress become greater to develop cracks in the SOFC element and shorten the use life thereof.

Further, the power generation amount of the SOFC is greatly influenced by the amount of oxygen permeating the bottom-provided porous support tube 4.

That is, since the concentration of oxygen is still high near the oxidizing gas feed opening 1a, the amount of oxygen ions reaching the fuel electrode 7 near there is great, so that the reacting rate between the oxygen ions and the fuel on the surface of the fuel electrode 7 is large to raise the temperature. With this increase in temperature, the reaction on the fuel electrode between the oxygen ions and the fuel gas is further activated. On the other hand, as the gas flowing out through the oxidizing gas feed opening 1a approaches the side of the gas outflow hole 9a, the concentration of oxygen in the gas decreases. Consequently, the amount of oxygen ions reaching the surface of the fuel electrode 7 near the gas outflow hole 9a decreases, so that the reaction amount between the oxygen ions and the fuel on the fuel electrode 7 is small to lower the elevation of the temperature. As a result, the reaction is further inactivated due to its lower temperature. This tendency becomes more conspicuous when the bottom-provided SOFC element becomes longer.

In addition, with recent improvements on the performance of the fuel cell, support tubes having excellent oxygen-diffusing properties have been required.

Similar problems occur in the case of the SOFC in which a fuel electrode is provided inside a solid electrolyte 6 and a fuel gas is passed through a space 29 inside a tube for the power generation, too. In such a case, since a significant amount of $CO_2$, steam, etc. are contained in the fuel gas having its concentration reduced, these ingredients attach to the surface of the electrode to hinder the reaction. Thus, the reaction becomes less active, so that the temperature of the SOFC element becomes considerably non-uniform in the longitudinal direction.

SUMMARY OF THE INVENTION

It is a first object of the present invention to provide a bottom-provided cylindrical solid oxide fuel cell in which non-uniformity in the reactivity and temperature in the longitudinal direction of the cell is reduced, thermal strain and stress are reduced, and power generation efficiency is enhanced.

It is a second object of the present invention to provide a cylindrical solid oxide fuel cell in which the permeating amounts of oxygen or fuel can be made uniform over every portion of an SOFC element, the permeating amount of oxygen or fuel is high, and the reactivity can be made uniform in the longitudinal direction of the SOFC element.

It is a third object of the present invention to provide a bottom-provided cylindrical solid oxide fuel cell in which non-uniformity in the reactivity and temperature in the longitudinal direction of the cell can be lessened, the thermal strain and stress can be reduced, the use life of the cell can be prolonged, and the power generation efficiency can be enhanced.

A first aspect of the present invention is to provide a solid oxide fuel cell comprising a bottom-provided cylindrical solid oxide fuel cell element including at least an air electrode, a solid electrolyte and a fuel electrode, and a gas feed pipe inserted into a cylindrical space inside the solid oxide fuel cell element and having a gas feeding portion to feed an oxidizing gas or a fuel gas into the cylindrical space inside the fuel cell element, wherein the gas feeding portion is provided at least a lateral face of the gas feed pipe.

A second aspect of the present invention is to provide a solid oxide fuel cell comprising an air electrode, a solid electrolyte, and a fuel electrode formed on an outer peripheral surface of a porous cylindrical support tube and being adapted to generate power by feeding a stream of a gas inside the cylindrical space in the porous cylindrical support tube, wherein a permeating amount of the gas permeating that portion of the porous cylindrical support tube which faces an upstream side of a stream of the gas passing through the space is made smaller than that of the gas permeating that portion of the porous cylindrical support tube which faces a downstream side of the gas stream.

A third aspect of the present invention is to provide a solid oxide fuel cell comprising a solid oxide fuel cell element including an air electrode, a solid electrolyte and a fuel electrode formed on the outer peripheral surface of a bottom-provided cylindrical porous support tube, and a gas feeding pipe inserted into a cylindrical space inside the solid oxide fuel cell element, wherein at least a lateral face of the gas feeding pipe is provided with a gas feeding portion for feeding an oxidizing gas or a fuel gas into the cylindrical space, and a permeating amount of the gas permeating that portion of the bottom-provided porous cylindrical support tube which faces an upstream side of a stream of the gas passing through the cylindrical space is made smaller than that portion of the bottom-provided cylindrical porous cylindrical support tube which faces a downstream side of the gas stream.

The third aspect of the present invention has been accomplished based on the following recognition.

That is, the tendency that the electrode reaction is active near the oxidizing gas feeding opening $1a$, while the reaction is inactive on the other end becomes more conspicuous as the length of a single bottom-provided cell becomes greater. The present inventors have solved this problem by the second aspect of the present invention, i.e., by varying the open porosity of the porous support tube 4 of the SOFC element to make the permeating amount of oxygen substantially uniform in the longitudinal direction. However, if the length of the SOFC element 40 becomes further greater, it is necessary to correspondingly increase the open porosity of the porous support tube 4 on the downstream side of the oxidizing gas. However, with increase in the open porosity, the strength of the support tube 4 drops. Therefore, there is a limit on the open porosity in the longitudinal direction which the above-mentioned porous support tube 4 is allowed to have.

Moreover, even if the flow rate of the oxidizing gas is merely increased in the case of the structure shown in FIG. 14, not only the SOFC element is cooled and the heat efficiency and the power generation efficiency are reduced, but also the SOFC element is likely to be cracked due to thermal strain.

Similar problems occur in the case of the SOFC in which a fuel electrode is provided inside a solid electrolyte 6, and a fuel gas is fed into a cylindrical space for power generation, too. In addition, in this case, since significant amounts of $CO_2$, steam, etc. are contained in the fuel gas having its concentration reduced, these ingredients are attached to the surface of the electrode to hinder the reaction. Thus, the reaction becomes less active to considerably make the temperature non-uniform.

The present inventors could realize the elimination of non-uniformity in the reactivity and temperature in the longitudinal direction of the cell and the reduction in the thermal strain and stress, the prolongation of the use life of the cell, and the improvement of the power generation efficiency by the third aspect of the present invention in view of the above problems.

These and other objects, features and advantages of the invention will be appreciated upon reading of the following description of the invention when taken in conjunction with the attached drawings, with the understanding that some modifications, variations and changes of the invention could be made by the skilled person in the art to which the invention pertains without departing from the spirit of the invention or the scope of claims attached hereto.

BRIEF DESCRIPTION OF THE DRAWINGS

For a better understanding of the invention, reference is made to the attached drawings, wherein:

FIG. 1 is a sectional view of an embodiment of the SOFC according to the first aspect of the present invention;

FIG. 2 is a sectional view of FIG. 1 taken along a line II—II;

FIGS. 3, 4, 5, 6, 7 and 8 are sectional views of other embodiments of the SOFC according to the first aspect of the present invention;

FIG. 9 is a sectional view of the SOFC according to the second aspect of the present invention;

FIG. 10 is a cut-perspective view of another embodiment of the SOFC according to the second aspect of the present invention;

FIG. 11 is a sectional view of FIG. 10 taken along a line XI—XI;

FIG. 12 is a graph showing the relationship between the average open porosity of the bottom-provided porous support tube and the permeating amount of an oxidizing gas;

FIG. 13 is a sectional view of an embodiment of the SOFC according to the third aspect of the present invention; and FIG. 14 is a sectional view of the conventional SOFC.

DETAILED DESCRIPTION OF THE INVENTION

FIG. 1 is a longitudinal sectional view of an embodiment of the SOFC according to the first aspect of the present invention. FIG. 2 is a sectional view of FIG. 1 taken along a line II—II. Same reference numerals as in the SOFC of FIG. 14 are given to the same functional members in this embodiment.

In the SOFC, a plurality of circular holes 2 having the same diameter are arranged in the lateral surface of an oxidizing gas feed pipe 1 in the longitudinal direction thereof. Flat plate-like ribs 3 are provided between the outer peripheral surface of the oxidizing gas feed pipe 1 and a porous support tube 4. For instance, two rows of the flat plate-like ribs are provided as shown in FIG. 2.

Therefore, an oxidizing gas fed into the oxidizing gas feed pipe 1 is blown out successively through the circular holes 2 as shown by arrows C. The oxidizing gas is utilized for power generation, and then mixed with a gas coming through an oxidizing gas feed opening 1a at the tip of the oxidizing gas feed pipe 1 and discharged to an exhaust gas chamber 19 as shown by arrows D.

An air electrode 5 may be made of $LaMnO_3$, $CaMnO_3$, $LaNiO_3$, $LaCoO_3$, $LaCrO_3$ or the like doped or not doped. Among them, $LaMnO_3$ added with strontium is preferred. A solid electrolyte 6 may be generally produced from yttria-stabilized zirconia or the like. A fuel electrode 7 may be generally made of nickel-zirconia cermet or cobalt-zirconia cermet.

According to the SOFC in this embodiment, the following effects can be obtained.

(1) As mentioned above, as the location goes away from the oxidizing gas feed opening in the prior art, the concentration of the oxidizing gas inside the cylindrical space 29 decreases, so that the electrochemical reaction is decreased and the temperature is correspondingly lowered.

To the contrary, according to the present embodiment, since a plurality of the circular holes 2 are successively provided in the latral face of the oxidizing gas feed pipe 1 in the longitudinal direction, each of the circular holes 2 functions as an oxidizing gas feeding portion, so that fresh oxidizing gas is fed through each of these circular holes 2. Therefore, since fresh oxidizing gas is fed over the entire cylindrical space 29, and is mixed with oxidizing gas having the concentration reduced, the gradient of the concentration of oxygen decreases also due to turbulence of the mixed gas stream. Consequently, the reaction on the electrode is made uniform, and the temperature is also made uniform. Owing to this, the thermal strain and stress can be reduced as a whole, and the electric power generating efficiency can be totally enhanced.

(2) Since the oxidizing gas feed pipe 1 is provided separately from the SOFC element 40 in the case of the SOFC having the structure shown in FIG. 14, it is difficult to accurately locate the oxidizing gas feed pipe 1 inside the cylindrical space 29. For this reason, since the location of the oxidizing gas feed pipe 1 varies inside the cylindrical space 29, it changes the flow of the oxidizing gas rising between the outer peripheral surface of the oxidizing gas feed pipe 1 and the inner peripheral surface of the porous support tube 4, which results in variations in the performances among fuel cells.

To the contrary, since the structure is
ed by connecting the oxidizing gas feed pipe 1 with the SOFC element 40 by the flat-plate like ribs 3 in this embodiment, the oxidizing gas feed pipe 1 can be assuredly located inside the cylindrical space 29, so that variations in the performances resulting from changes in positional relationship between the oxidizing gas feed pipe 1 and the SOFC element 40 can completely be diminished. In addition, since the flat plate-like ribs extend radially from the oxidizing gas feed pipe 1, the mechanical strength of the SOFC element 40 can greatly be increased from the standpoint of the structural mechanics.

When three or more rows of the flat plate-like ribs 3 are provided and an angle between the adjacent ribs 3 is smaller than 180°, it is more preferable in further increasing the mechanical strength, particularly, the radial crushing strength of the SOFC element.

In an SOFC shown in FIG. 3, a slit 12 having a slender rectangular shape is provided in a lateral face 1b of the oxidizing gas feed pipe 1 as the oxidizing gas feeding portion instead of a plurality of the circular holes, and fresh oxidizing gas flows out through the slit 12. This slit 12 is provided for each of sections divided by the flat plate-like ribs 3.

In FIG. 4, a plurality of circular holes 22 are provided, as an oxidizing feeding portion, in the lateral face of an oxidizing gas feed pipe 1, and the diameter of the circular holes 22 is gradually increased from the vicinity of an opening of the SOFC element 40 toward the bottom portion thereof. Accordingly, a phenomenon that since a majority part of the oxidizing gas flows out through the circular holes 22 near the opening of the SOFC element so that a sufficient amount of the oxidizing gas will not be fed to the vicinity of the bottom portion can be prevented. The concentration of the oxidizing gas inside the cylindrical space 29 can be regulated by adjusting the diameter of the circular holes 22.

In the SOFC in FIG. 5, a slit 32 is provided as an oxidizing gas feeding portion in the lateral face of an oxidizing gas feed pipe 1 as in the SOFC shown in FIG. 3. The width of the slit 32 is decreased near the opening of the SOFC element 40, and gradually increased toward the bottom portion of the SOFC element 40. By employing such slits 32, effects similar to those obtained by the embodiment in FIG. 4 can be attained.

In the SOFC shown in FIG. 6, flat plate-like ribs 3A are extended outside from the cylindrical space 29 up to the base portion of the oxidizing gas feed pipe 1. Since the rows of the ribs thus shaped function as heat-emitting fins, the extended portions can enhance heat exchange efficiency between the oxidizing gas flowing through the oxidizing gas feed pipe 1 and the combustion exhaust gas flowing outside the SOFC element when the oxidizing gas fed through the oxidizing gas feed pipe 1 is to be preliminarily heated at the base portion of the feed pipe. Therefore, since the temperature of the oxidizing gas to be fed into the cylindrical space 29 can further be raised, the heat exchange efficiency of the entire fuel cell can be further improved.

FIG. 7 is a partial sectional view of a so-called multi-cell type SOFC to which the present invention is applied.

A plurality of air electrodes 15 are provided on the surface of a bottom-provided porous support tube 4 at a specific interval, and a solid electrolyte 16 and a fuel electrode 17 are successively formed on each of the air electrodes 15. The fuel electrodes 17 are successively electrically connected to the adjacent air electrodes 15 by interconnectors 28, respectively.

The above-mentioned embodiments ma be modified in various manners.

In FIGS. 1, 4, 6 and 7, the orientation of the circular hole 2 is aligned normal to the wall surface of the oxidizing gas feed pipe 1, the oxidizing gas flows out through the circular hole 2 horizontally in FIG. 1. Alternatively, the circular hole 2 may be inclined normal to the wall surface of the oxidizing gas feed pipe 1 at a given angle. Further, when the circular hole is inclined normal wall surface of the oxidizing feed pipe 1 in the longitudinal direction (in a vertical direction in FIG. 1), the oxidizing gas upwardly or downwardly flows out. When the orientation of the circular hole is inclined to the normal wall surface of the oxidizing feed pipe 1 in the radial direction of the feed pipe 1 (in the lateral direction in FIG. 1), the oxidizing gas flows out in a deviated fashion to the left or the right.

That is, for example, as shown in FIG. 8, when the oxidizing gas feed holes 42 provided in the lateral face of the oxidizing gas feed pipe 1 are inclined and the oxidizing gas flows out toward the bottom in an inclined direction as shown by arrows C, this oxidizing gas stream is crushed with that flowing from the bottom portion as shown by arrows B. Consequently, the former oxidizing gas stream is stirred and converted to turbulence by the latter, so that the gradient of the concentration of oxygen can be reduced further by this stirring effect.

Although the fuel cell 7, 17b is positioned outside the air electrode 5, 15 in the above-mentioned embodiments, this electrode arrangement may be reversed. In such a case, the fuel gas is fed into the annular space 29, and the oxidizing gas is fed outside the SOFC element.

In FIG. 1, although the fuel cell element 40 is vertically supported, the entire power generator may be arranged horizontally or inclined at a given angle.

In the above-mentioned embodiments, although a single cell is formed by using the porous bottom-provided tube, the air electrode itself is made as a rigid body so that the cell element itself can be structurally independently used.

In FIGS. 3 through 6, if a flange portion is provided at the left terminal end of the oxidizing gas feed pipe 1, the SOFC element can easily be fixed to the fuel cell body by fitting the flange portion to the upper plate 8 when it is used as a fuel cell as shown in FIG. 1.

Further, although only the cylindrical space 29 between the oxidizing gas feed pipe and the porous support tube 4 is divided by the flat plate-like ribs 3, it may be possible to extend the flat plate-like ribs to the center of the oxidizing gas feed pipe so that the interior of the oxidizing gas feed pipe may be divided into a plurality of chambers defined by the ribs.

By so doing, when a film is to be partially formed on the surface of a porous support tube through gas phase reaction as in the interconnectors for the fuel cell, the partial film formation is possible by flowing the reactive gas through only that portion of the chambers (sections) which corresponds to the portion upon which the film is to be formed. Thus, conventional masking may be omitted.

Furthermore, in the above-mentioned embodiments, although the circular holes 2, 22, or the slits 12, 32 provided in the lateral face of the oxidizing gas feed pipe 1 are employed as the oxidizing gas feeding portion, an oxidizing gas feed portion having other constructions may be employed. For example, a number of small holes may be provided at random. In this case, if the density of the small holes is increased as the location approaches the bottom portion, effects similar to those in the embodiments of FIGS. 4 and 5 can be obtained. Moreover, the SOFC may be fitted not only horizontally or vertically, but also inclined to the fuel cell body at a given angle.

According to the solid oxide fuel cell in the first aspect of the present invention, since the gas feed portion for feeding oxidizing gas or fuel gas into the cylindrical space is provided in at least the lateral face of the gas feed pipe, fresh oxidizing gas or fuel gas is fed through the gas feeding portion at the lateral face, and mixed with the gas having the concentration already reduced. Consequently, since the gradient of the concentration of oxygen in the annular space is reduced, the reactivity of the reaction and the temperature on the electrode may be made uniform. Thereby, the thermal stress can be totally reduced, and the entire electrical power generation efficiency can be enhanced.

In the following, the second aspect of the present invention will be explained. The same reference numerals in FIG. 14 are given to same functional members, and explanation thereof will be omitted.

FIG. 9 is a sectional view of an embodiment of the SOFC according to the second aspect of the present invention. What features this embodiment is that the distribution of the permeability of the oxidizing gas through a bottom-provided porous support tube 4 in the longitudinal direction is particularly noted.

More specifically, no particular attention has been conventionally paid to the porosity of the bottom-provided porous support tube 4, and the porosity was almost uniform over its entire length. Owing to this, the oxidizing gas flowing through a cylindrical space 29 penetrates the bottom-provided porous support tube 4, and reaches the air electrode 5 almost uniformly through the bottom-provided porous support tube 4 at every location. On the other hand, since the concentration of oxygen in the oxidizing gas decreases toward the downstream side, that is, as the location goes away from the bottom portion 4a. As shown in FIG. 14, the amount of oxygen penetrating the solid electrolyte 6 to be actually utilized for the power generation increases as the location approaches the bottom portion 4a, while it decreases as the location approaches the opening end.

Different from this, according to the SOFC in the second aspect of the present invention, the open porosity of the bottom-provided porous support tube 4 is made smaller on the upstream side of the oxidizing gas stream flowing through the cylindrical space 29 and larger on the downstream side is made larger. That is, the open porosity at the bottom portion 4a of the porous support tube is made smaller than that at an end portion 4b on the opening end side in the power-generating portion. As a result, the amount of the oxidizing gas penetrating the bottom portion 4a is smaller than that penetrating the end portion 4b of the power-generating portion. On the other hand, since the concentration of oxygen in the oxidizing gas passing through the bottom portion 4a is greater than that passing through the end portion 4b, as shown in FIG. 9, the amount of the oxygen passing through the bottom-provided porous support tube 4 is made uniform in the entire longitudinal direction of the SOFC element 40. Thus, the non-uniformity of the reaction on the electrode in the longitudinal direction of the SOFC element can be corrected. Furthermore, since the heat generation of the entire bottom-provided porous support tube 4 is consequently made uniform, the thermal strain and stress is reduced, and occurrence of cracks is prevented. Therefore, the long life of the SOFC element can be attained, and the powder generation efficiency can be enhanced.

As mentioned above, in this embodiment, although the open porosity of the bottom-provided porous support tube 4 is made different between the bottom portion 4a and the end portion 4b of the power generating portion, it is preferable to gradually increase the open porosity from the bottom portion 4a to the end portion 4b of the power generating portion.

Further, it is preferable to set the open porosity of the bottom-provided porous support tube 4 to 20–50% at every location. In addition, it is also preferable to set the diameter of pores therein at 1 to 10 $\mu$m.

If the open porosity of the bottom-provided porous support tube 4 is set at more than 50%, strength of the support tube 4 greatly lowers and reliability in long term durability disappears. On the other hand, if the open porosity is set at less than 20%, the power generating efficiency of the SOFC element drops. If the pore diameter of the support tube is more than 10 $\mu$m, strength of the support tube 4 drops, and portions of the fuel cell which contribute to power generation are localized. On the other hand, if it is less than 1 $\mu$m, the permeating amount of the gas drops.

Preferably, difference in the open porosity (%) between the bottom portion and the open end portion of the power generating portion is 4–6%, 8–12%, and not more than 15% when the distance between the bottom 4a and the open end of the power generating portion 4b are 1,500 mm, 2,000 mm, and 3,000 mm respectively. As to the difference in the open porosity between the bottom portion and the open end portion of the power generating portion of the support tube 4, the inventors found out that the following relations are preferred with respect to $1.0 \leq x \leq 3.0$. When $1.0 \leq x \leq 2.2$, $2.3 \times 2 - 1.2 \leq y \leq 3.4 \times 2 - 1.7$, and when $2.2 < x \leq 3.0$, $x^2 + 5.1 < y \leq 1.5$ in which x is the length (m) of the support tube, and y is the difference (%) in the open porosity between the bottom portion and the open end portion.

In order to decrease the open porosity of the bottom portion 4a of the bottom-provided support tube 4 and give a gradient to the magnitude of the open porosity, it is preferable to produce the bottom-provided porous support tube 4 by any on of the following ways.

(1) When the bottom-provided porous support tube 4 is produced by firing, a bottom-provided ceramic tubular shaped body is held at the open end portion, and the shaped body is hanged and a weight is hanged from the bottom portion, while the bottom portion is located downwardly. By so doing, that portion of the bottom-provided tubular shaped body which is located near the opening end of the shaped body receives load, and slightly expands to increase the open porosity. On the other hand, the open porosity of that portion of the shaped body which is located on the bottom side can be made smaller due to no application of load.

The bottom-provided porous support tube 4 is assembled on a ceramic setter as mentioned above, and fired inside a furnace.

Firing conditions of the support tube 4 are appropriately set, although depending upon a desired porosity thereof, such that the heating rate is 20°–100° C./h, the firing temperature is 1,400°–1,600° C., the firing temperature-keeping time is 30 minutes to 4 hours, and the cooling rate is 20°–100° C./h.

(2) The bottom-provided porous support tube is once fired, and after firing, open pores of the support tube are impregnated and filled with a filler. Then, the support tube is dried or fired. At that time, when the impregnating amount on the bottom side of the bottom-provided porous support tube is made greater than that on the opening end side, the open porosity of the bottom portion is decreased and that on the opening end side is made greater.

An air electrode 5 is made of $LaMnO_3$, $CaMnO_3$, $LaNiO_3$, $LaCoO_3$, $LaCrO_3$ or the like doped or not doped. Among them, $LaMnO_3$ added with strontium is preferred. A solid electrolyte 6 may be generally produced from yttria-stabilized zirconia or the like. A fuel electrode 7 is generally made of nickel-zirconia cermet or cobalt-zirconia cermet.

Although an example in which the permeating amount of the oxidizing gas is regulated by controlling the porosity of the bottom-provided porous support tube 4 is mentioned in the above embodiment, the penetrating amount of oxidizing gas may be controlled by another way.

That is, the gas permeable amount in the bottom-provided porous support tube 4 is varied by applying a slurry to the inner peripheral surface and/or the outer peripheral surface made of the bottom-provided tubular shaped body made of the ceramic material in the spiral form, and sintering it.

More particular, when a band of the slurry is to be spirally coated, the width of the slurry band is made greater on the bottom side, and the width of that band is made smaller as it approaches the opening end. Alternatively, the density of the slurry band is made greater on the bottom side, and is made smaller as the band approaches the opening end. Thereby, it becomes possible that the penetrating amount of the oxidizing gas is made smaller on the bottom side, and it is larger as the location approaches the opening end. Further, the same effect can be obtained by making the grain diameter smaller on the bottom side and smaller as the location approaches the opening end.

As a matter of course, the permeability of the oxidizing gas through the bottom-provided porous support tube may be controlled only by varying the grain diameter in the slurry applied over the inner peripheral surface and/or the outer peripheral surface of the bottom-provided porous support tube having undergone the firing.

FIG. 10 is a broken perspective view of another embodiment of the cylindrical SFC element having an opposed end-opened type, and FIG. 11 is a sectional view of FIG. 10 taken along a line XI—XI.

An air electrode 25 is provided around the outer periphery of a cylindrical porous ceramic support tube 24, and a solid electrode 26 and a fuel electrode 27 are provided along the outer periphery of the air electrode 25. In FIG. 10, an interconnector 23 is provided on the air electrode 25 at the upper area, and a connection terminal 24 is attached onto the interconnector 23. In order to connect such cylindrical SOFC elements 60 in series, the air electrode 25 of an SOFC element 60 is connected to the fuel electrode 27 of an adjacent SOFC element through the interconnector 23 and the connection terminal 24. On the other hand, in order to connect the cylindrical SOFC elements 60 in parallel, the fuel electrodes of the adjacent SOFC elements are connected by Ni felt or the like.

The fuel gas flows along the outer periphery of the fuel electrode as shown by arrows G, and the oxidizing gas is fed inside the cylindrical space 11 of the cylindrical porous ceramic support tube as shown by an arrow H for the generation of power.

In the cylindrical SOFC of this embodiment, the permeability of the oxidizing gas stream is made smaller at the end portion 24a on the upstream side of the oxidizing gas stream and larger at the end portion of the downstream side in the cylindrical porous ceramic support tube 24. More particularly, as in the embodiment in FIG. 9, the porosity of the cylindrical porous ceramic support tube 24 is made smaller on the side of the end portion 24a and larger on the side of the end portion 24b in the cylindrical porous ceramic support tube 24. Alternatively, the permeability of the oxidizing gas through the cylindrical porous ceramic support tube is controlled by the slurry which is applied to the outer peripheral surface and/or the inner peripheral surface of the cylindrical porous ceramic support green body before firing, followed by firing.

By so doing, as mentioned above, since the permeability of oxygen itself through the cylindrical porous ceramic support tube is made uniform over the entire cylindrical space 11, effects similar to those mentioned above can be obtained.

As a matter of course, the second aspect of the present invention may be applied to the multi-cell type SOFC. In the multi-cell type SOFC, air electrodes are provided on the surface of a cyindrical porous support tube at a plurality of locations at a specific interval, a solid electrolyte and a fuel electrode are successively provided on each of the air electrodes, and fuel electrodes are successively electrically connected to the adjacent air electrodes through interconnectors, respectively.

The above-mentioned embodiments may be modified in various manners.

Although the fuel electrode 7, 27 is provided on the outer side of the air electrode 5, 25 in the above-mentioned embodiments, this electrode arrangement may be reversed. In this case, the fuel gas is fed into the cylindrical space 11, 29, and the oxidizing gas is fed outside the SOFC element.

Although the SOFC element 40 is vertically held in FIG. 9, the entire power generating device may be horizontally held, or inclined at a given angle.

The porous support tube may be a cylindrical shape, a cylindrical shape with a bottom, a tetragonal prismatic shape, a hexagonal prism or the like.

In the following, a further concrete embodiment will be explained.

First, a calibrated line showing a relationship between the average open porosity of the bottom-provided porous support tube and the permeating amount of the oxidizing gas is shown in FIG. 12.

In a graph of FIG. 12, the permeability of the oxidizing gas is expressed by relative ratio taking that at the average open porosity of the bottom-provided porous support tube being 35% as 100. As is seen from FIG. 12, both of them have a nearly straight line relationship.

Next, bottom-provided porous support tubes of FIGS. 1 and 14 having a length of 1,500 mm were prepared, and an air electrode, a solid electrolyte and a fuel electrode were formed on each of the support tubes to form SOFC elements shown in FIGS. 1 and 14. Then, each of the SOFC elements of the present invention and the conventional SOFC element was placed inside a reacting chamber 20 of a cell. The interior of the cell reacting chamber 20 was heated to 1,000° C., and air and methane were fed into the oxidizing gas feed pipe 1 and through the fuel inflow holes 10a, respectively, at their respective constant flow rates. Thereby, oxygen ions were reacted with methane o the surface of the fuel electrode of each of the SOFC elements.

Temperatures on the surface of the fuel electrode were measured during the reaction at measuring locations P1, P2, P3, P4 and P5, which divided a straight portion of each of the SOFC elements shown in FIGS. 1 and 14 into four equal portions, by using thermocouples, and the concentrations of oxygen at locations inside the cylindrical space 29 corresponding to the locations of P1, P2, P3, P4 and P5, respectively were measured by using an $O_2$ meter. Then, the SOFC element was cooled to room temperature, and the fuel electrode, the solid electrolyte and the air electrode were removed, and the open porosity at P1, P2, P3, P4 and P5 were measured.

The permeating amounts of the oxidizing gas at the above locations were calculated from the measured values of the open porosities at the above location and the calibrated line in FIG. 12, respectively. Further, the permeating amount of oxygen at each of these locations was determined as a product between the permeating amount of the oxidizing gas and the concentration of oxygen at each location. These results are shown in Tables 1 and 2 below.

TABLE 1

| Location | SOFC in FIG. 14 | | | | |
|---|---|---|---|---|---|
| | P1 | P2 | P3 | P4 | P5 |
| Open porosity (%) | 35.2 | 35.0 | 35.0 | 35.1 | 35.3 |
| Penetrating amount of oxidizing gas | 100.6 | 100 | 100 | 100.3 | 100.9 |
| Oxygen concentration (%) | 16.8 | 17.5 | 18.4 | 19.2 | 20 |
| Penetrating amount of oxygen | 16.9 | 17.5 | 18.4 | 19.3 | 20.2 |
| Surface temperature of fuel electrode (°C.) | 1000 | 1010 | 1025 | 1052 | 1076 |

TABLE 2

| Location | SOFC in FIG. 1 | | | | |
|---|---|---|---|---|---|
| | P1 | P2 | P3 | P4 | P5 |
| Open porosity (%) | 40.6 | 39.0 | 37.5 | 36.1 | 35.0 |
| Penetrating amount of oxidizing gas | 116 | 111.4 | 107.1 | 103.1 | 100 |
| Oxygen concentration (%) | 16.8 | 17.5 | 18.4 | 19.2 | 20 |
| Penetrating amount of oxygen | 19.5 | 19.5 | 19.7 | 19.8 | 20 |
| Surface temperature of fuel electrode (°C.) | 1055 | 1058 | 1060 | 1062 | 1068 |

It is seen from Table 1 that since the amount of oxygen ions fed onto the surface of the fuel electrode near P5 was greater, the degree of reaction between methane as the fuel gas rose, so that the temperature of the surface of the fuel electrode was far higher than that in the atmosphere inside the cell reacting chamber 20 (1,000° C.). On the other hand, Table 1 also shows that the temperature of the surface of the fuel electrode near P1 was near to that in the atmosphere in the cell reaction chamber 20, so that the cell reaction was inactive.

On the other hand, as seen from the results in Table 2, since the temperature of the surface of the fuel electrode was higher than that of the atmosphere in the cell reacting chamber 20, and almost identical over the entire surface of the fuel electrode in the case of the SOFC element using the support tube 4 prepared according to the second aspect of the present invention. Therefore, it is seen that when the permeating amounts of oxygen at the locations of P1, P2, P3, P4 and P5 are made almost identical, the cell reaction is uniformly effected at every location.

It is clear from the above results that according to the present invention, the amount of oxygen penetrated through the bottom-provided porous support tube and applied for the power generation can be made uniform over every location of the bottom-provided porous support tube, and accordingly excellent oxygen-permeability can be imparted upon the support tube. As a result, the cell reactivity can be made uniform in the longitudinal direction of the SOFC element, and the distribution of temperature can also be made uniform in the longitudinal direction, so that occurrence of cracks can be prevented.

According to the solid oxide fuel cell of the second aspect of the present invention, the gas permeability at that portion of the cylindrical porous support cylinder which faces the upstream side of the stream of the gas flowing through the cylindrical space is made smaller than the gas permeability at that portion which faces downstream side. Therefore, the amount of the gas penetrating the cylindrical porous support tube on the upstream side is smaller than that of the gas penetrating the cylindrical porous support tube on the downstream side.

On the other hand, the concentration of oxygen or the concentration of fuel in the gas flowing on the upstream side is lower than that in the gas flowing on the downstream side.

Therefore, the amount of oxygen or fuel penetrating the bottom-provided cylindrical porous support tube is made uniform between the upstream side and the downstream side, so that non-uniformity in the reaction on the electrode can be corrected.

In the following, the third aspect of the present invention will be explained based on FIGS. 1 through 5, 7, 8 and 14 used to illustrate the first aspect of the present invention as well as FIG. 13. Same reference numerals in FIG. 14 are given to the same functional members as those in these figures.

FIGS. 1 and 2 are a longitudinal sectional view of an embodiment of the SOFC element according to the third aspect of the present invention, and a sectional view of FIG. 1 taken along a line II, respectively.

In FIG. 1, a plurality of circular holes 2 having the same diameter are provided in the lateral face 1b of an oxidizing gas feed pipe 1 in the longitudinal direction, and flat plate-like ribs 3 are provided between the peripheral surface of the oxidizing gas feed pipe 1 and a porous support tube 4, for example, in two rows. Therefore, the oxidizing gas fed inside the oxidizing gas feed pipe 1 is successively blown out through the circular holes 2 as shown by arrows C. After the oxidizing gas is used for the power generation, the gas is mixed with the oxidizing gas coming out from an oxidizing gas feed opening 1a, and discharged to the exhaust gas chamber 19 as shown by arrows D.

In this embodiment, the open porosity of the bottom-provided porous support tube 4 is made smaller on the upstream side of the stream of the oxidizing gas flowing inside the cylindrical space 29, and made greater within a given range on the downstream side.

The air electrode 5 is made of $LaMnO_3$, $CaMnO_3$, $LaNiO_3$, $LaCoO_3$, $LaCrO_3$ or the like doped or not doped. Among them, $LaMnO_3$ added with strontium is preferred. The solid electrolyte 6 may be generally made of yttria-stabilized zirconia or the like. The fuel electrode 7 may be generally made of nickel-zirconia cermet or cobalt-zirconia cermet.

According to the SOFC in this embodiment, the following effects can be obtained.

(1) As mentioned above, in the prior art, as the location inside cylindrical space 29 goes apart from the oxidizing gas feed opening, the concentration of the oxidizing gas decreases, the electrochemical reaction drops, and accordingly the temperature lowers. That is, when the oxidizing gas is discharged through the feeding opening of the SOFC element 40 in FIG. 14, for example, about 20% of oxygen contained in the oxidizing gas is consumed, and the reaction on the electrode is largely non-uniform. This tendency becomes more conspicuous with increase in the length of the SOFC element.

To the contrary, since a plurality of the circular holes 2 are provided on the lateral face 1b of the oxidizing gas feed pipe 1 in the longitudinal direction in the case of the present embodiment, each of the circular holes 2 functions as the oxidizing gas feeding portion, so that fresh oxidizing gas is fed through each of the circular holes 2. Therefore, fresh oxidizing gas is fed over the entire cylindrical space 29, and is mixed with the oxidizing gas having the concentration already reduced, so that the gradient of the concentration of oxygen ca be reduced also due to the turbulence of the mixed gas stream.

In addition, it is important to vary the open porosity of the bottom-provided porous support tube 4 from the side of the bottom portion 4a to the side of the end portion 4b for the power generating portion. As shown in FIG. 12, the porosity of the bottom-provided support tube and the permeating amount of the oxidizing gas have almost a straight-line relationship.

Next, bottom-provided porous support tubes of FIGS. 1 and 14 having a length of 3,000 mm were prepared, and an air electrode, a solid electrolyte and a fuel electrode were formed on each of the support tubes to produce SOFC elements shown in FIGS. 1 and 14. Each of the invention SOFC element and the conventional SOFC element was placed in a reacting chamber 20 of a cell. Then, the interior of the reacting chamber 20 was heated to 1,000° C., and air and methane were fed to the oxidizing gas feed pipe 1 and through the fuel inflow holes 10a, respectively, at their respective flow rates, so that oxygen ions and methane were reacted on the surface of the fuel electrode of the SOFC element.

Then, temperatures of the surface of the fuel electrode were measured during the reaction at measuring locations P11, P12, P13, P14, P15, P16, P17 and P18 dividing a straight liner portion of the SOFC element 40 into seven equal portions, by thermocouples, and at the same time the concentrations of oxygen were measured at locations inside the cylindrical space corresponding to the locations of P11, P12, P13, P14, P15, P16, P17 and P18, respectively, by using an 02 meter. Then, the SOFC element was cooled to room temperature, and the open porosities at the locations P11, P12, P13, P14, P15, P16, P17 and P18 of the bottom-provided porous support tube 4 were measured in the same manner as mentioned before.

The permeating amounts of the oxidizing gas were calculated from the measurement values of the open porosities at the above locations and the calibration line in FIG. 12, and the permeating amount of oxygen at each location was determined as a produce between the permeating amount of the oxidizing gas and the concentration of oxygen. These results are shown in Tables 3, 4 and 5.

Table 3 shows results with respect to the case where the open porosity was almost constant in the longitudinal direction of the bottom-provided porous support tube 4, and air was fed through the oxidizing gas feed opening la of the oxidizing gas feed pipe 1 (FIG. 14).

Table 4 shows the results with respect to the case where the open porosity of the bottom-provided porous support tube 4 in the longitudinal direction was made greater on the portion facing the downstream side of the oxidizing gas and smaller, and the oxidizing gas was fed through the oxidizing gas feed opening 1a of the oxidizing gas feed pipe 1.

Table 5 shows results with respect to the case where the open porosity of the bottom-provided porous support tube 4 in the longitudinal direction was made greater in the portion facing the downstream side of the oxidizing gas, and air was fed through the oxidizing gas feed opening 1a of the oxidizing gas feed pipe 1 and the circular holes 2 of the lateral face 1b (FIG. 1).

TABLE 3

| Location | SOFC in FIG. 14 | | | | | | | |
|---|---|---|---|---|---|---|---|---|
| | P11 | P12 | P13 | P14 | P15 | P16 | P17 | P18 |
| Open porosity (%) | 35.1 | 35.3 | 34.9 | 35.0 | 35.2 | 35.0 | 35.1 | 35.3 |
| Penetrating amount of oxidizing gas | 100.3 | 100.9 | 99.7 | 100.0 | 100.6 | 100.0 | 100.3 | 100.9 |
| Oxygen concentration (%) | 13.4 | 14.2 | 15.0 | 16.1 | 17.2 | 18.1 | 19.2 | 20.0 |
| Penetrating amount of oxygen | 13.4 | 14.3 | 14.9 | 16.1 | 17.3 | 18.1 | 19.2 | 20.1 |
| Surface temperature of fuel electrode (°C.) | 1002 | 1002 | 1005 | 1008 | 1019 | 1040 | 1059 | 1078 |

It is seen from Table 3 that the amount of oxygen ions fed onto the surface of the fuel electrode near P18 was great, the reaction rate between methane gas as the fuel gas was high, and consequently the temperature of the surface of the fuel electrode was far greater than that (1,000° C.) of the atmosphere in the cell reacting chamber 20. The amount of oxygen ions fed onto the surface of the fuel electrode decreased toward the downstream side in the order of P17, P16, P15 and P14, and accordingly the reaction amount between the fuel gas decreased. Consequently, the temperature of the surface of the fuel electrode at each of these locations dropped.

TABLE 4

| Location | P11 | P12 | P13 | P14 | P15 | P16 | P17 | P18 |
|---|---|---|---|---|---|---|---|---|
| Open porosity (%) | 49.6 | 47.8 | 45.0 | 44.4 | 41.4 | 39.2 | 37.1 | 34.8 |
| Penetrating amount of oxidizing gas | 141.7 | 136.6 | 128.6 | 126.8 | 118.3 | 112.0 | 106.0 | 99.4 |
| Oxygen concentration (%) | 11.8 | 12.7 | 13.7 | 14.3 | 15.7 | 17.0 | 18.4 | 20.0 |
| Penetrating amount of oxygen | 16.7 | 17.3 | 17.7 | 18.2 | 18.5 | 19.0 | 19.5 | 20.0 |
| Surface temperature of fuel electrode (°C.) | 1018 | 1025 | 1034 | 1042 | 1050 | 1059 | 1070 | 1074 |

It is seen from Table 4 that the differences in temperature of the surface of the fuel electrodes among P11 through P18 were greatly reduced, which enhanced practical applicability. However, since the very long element having a length of as much as 3 m was used, insufficient points remained in realizing uniform power generation of the SOFC element.

TABLE 5

| Location | SOFC in FIG. 1 | | | | | | | |
|---|---|---|---|---|---|---|---|---|
| | P11 | P12 | P13 | P14 | P15 | P16 | P17 | P18 |
| Open porosity (%) | 49.4 | 47.7 | 45.1 | 44.6 | 41.2 | 39.0 | 37.2 | 35.1 |
| Penetrating amount of oxidizing gas | 141.1 | 136.2 | 128.9 | 127.4 | 117.7 | 111.4 | 106.3 | 100.2 |
| Oxygen concentration (%) | 15.0 | 14.7 | 14.8 | 14.9 | 17.0 | 18.9 | 18.8 | 20.0 |
| Penetrating amount of oxygen | 21.0 | 20.0 | 19.0 | 19.0 | 20.0 | 21.0 | 20.0 | 20.0 |
| Surface temperature of fuel electrode (°C.) | 1075 | 1074 | 1070 | 1071 | 1072 | 1073 | 1074 | 1075 |

Table 5 shows results for the case where the SOFC element employing the support tube 4 produced according to the third aspect of the present invention was used, and air was fed through the gas feed opening 1a of the gas feed pipe 1 and the circular holes 2 for the measurement. It is seen from Table 5 that since the temperatures of the surface of the fuel cell at the locations P11 through P18 were higher than that of the atmosphere inside the cell reacting chamber 20, and almost identical over the entire surface, the power was almost uniformly generated inside the SOFC element. Further, since the cell reaction occurred at substantially the same temperature in the longitudinal direction of the SOFC element, occurrence of cracks in the SOFC element can be prevented, and reliability in long use can be enhanced.

Next, the relationship between the open porosity and the mechanical strength of the bottom-provided porous support tube is shown in Table 6. In Table 6, the flexural strength of the bottom-provided porous support tube was expressed by relative ratio by taking that of the support tube having the average open porosity being 35% as 100.

TABLE 6

| Open porosity (%) | 35.0 | 42.3 | 46.8 | 52.3 |
|---|---|---|---|---|
| Flexural strength | 100 | 89.0 | 78.0 | 72.0 |

When the open porosity exceeds 50%, the strength of the porous support tube 4 reached only about 70% of the strength at the open porbsity of 35% of the porous support tube 4, so that the reliability of the SOFC element for the long use is deteriorated. Therefore, it is important that the open porosity of the porous support tube 4 in the longitudinal direction is set at not more than 50%, and the oxidizing gas is fed through the circular holes 2 at the lateral face of the oxidizing gas feed pipe 1 to increase the concentration of oxygen and make the cell reaction in the longitudinal direction of the SOFC element uniform.

As mentioned above, according to the SOFC element in this embodiment, the strength of the SOFC element is maintained high, the concentration of oxygen in the oxidizing gas inside the cylindrical space 29 is made uniform, and the permeability of the oxidizing gas penetrating through the bottom-provided porous support tube 4 from the side of the cylindrical space is controlled. The non-uniformity of the electrode reaction can be corrected by skillfully combining these techniques. By so doing, since the heat generation can be made uniform in the entire bottom-provided porous support tube 4, the thermal strain and stress can be reduced, the use life of the SOFC element can be prolonged by preventing cracking, and the power generating efficiency can be improved.

(2) As mentioned before, since the oxidizing gas feed pipe 1 is separately provided from the SOFC element in the SOFC having the structure shown in FIG. 14, it is very difficult to accurately locate the oxidizing gas feed pipe 1 inside the cylindrical space 29. Owing to this, since the oxidizing gas feed pipe 1 varies its location inside the cylindrical space 29, the flow of the oxidizing gas rising between the outer peripheral surface of the oxidizing gas feed pipe 1 and the inner peripheral surface of the porous support tube 4 is varied, so that the performances of the cells vary among them.

To the contrary, according to the present embodiment, since the structure is integrated by connecting the oxidizing gas feed pipe 1 with the SOFC element 40 by means of the flat plate-like ribs 3, the oxidizing gas feed pipe 1 can be accurately located inside the cylindrical space 29, so that variations in the performances resulting from changes in the positional relationship between the oxidizing gas feed pipe 1 and the SOFC element 40 can be completely diminished. In addition, since the flat plate-like ribs 3 radially extend from the oxidizing gas feed pipe 1, the mechanical strength of the SOFC element 40 is conspicuously increased from the standpoint of the structural mechanics.

When the flat plate-like ribs 3 are provided in three or more rows, and the angle formed between the adjacent ribs is set at not more than 180°, the mechanical strength, particularly, the radial crushing strength of the SOFC element can be favorably further increased.

In this embodiment, although the open porosity of the bottom-provided porous support tube 4 is varied between the bottom portion 4a and the end portion 4b of the power-generating portion, it is preferable to gradually increase the open porosity from the bottom portion 4a to the end portion 4b of the power generating portion.

It is preferable that the open porosity of the bottom-provided porous support tube 4 is set at 20-50% at every location. Further, it is preferable that the diameter of pores in the porous support tube 4 is 1-10 $\mu$m.

If the open porosity of the support tube 4 exceeds 50%, the mechanical strength of the support tube 4 greatly lowers, so that the reliability in the case of the long use of the SOFC element cannot be realized. On the other hand, if it is less than 20%, the permeating amount of the oxidizing gas greatly decreases, so that the power generating efficiency is unfavorably dropped.

The difference in the open porosity between the bottom portion 4a and the end portion 4b of the power generating portion is preferably not more than 15% when the distance between the bottom portion 4a and the end portion 4b of the power generating portion is 3,000 mm.

In order to make the open porosity of the bottom portion 4a of the bottom-provided porous support tube 4 smaller and give a gradient to the open porosity, it is preferable that the bottom-provided porous support tube 4 is produced as follows:

(1) When the bottom-provided porous support tube 4 is to be produced by firing, the bottom-provided tubular ceramic shaped body is held and hanged at and from the opening end side, while the bottom portion is arranged downwardly and a weight is hanged from the bottom portion. By so doing, the open porosity of that portion of the bottom-provided tubular shaped body which is located near the opening end portion becomes greater because that portion is slightly extended under application of the weight, while the open porosity of the bottom portion is made smaller because application of no weight.

The bottom-provided porous support tube 4 is assembled on a ceramic setter, and fired inside a furnace. The firing conditions are set, although depending upon a desired porosity of the support tube 4, such that the heating rate is 20°-200° C./h, the firing temperature is 1,400° to 1,600° C., the firing temperature-keeping time is 30 minutes to 10 hours, and the cooling rate is 20°-200° C./h.

(2) The bottom-provided porous support tube is once fired, and open pores are impregnated and filled with a filler after the firing, followed by drying or firing. At that time, the open porosity of the bottom portion is made smaller on the side of the bottom portion of the bottom-provided porous support tube than that on the side of the opening end by making the impregnating amount of the filler greater on the former side than that on the latter side.

In the above embodiments, although the permeating amount of the oxidizing gas is controlled by controlling the open porosity of the bottom-provided of the bottom-provided porous support tube 4 itself, the permeating amount of the oxidizing gas may be controlled by other processes mentioned in connection with the second aspect of the present invention.

The structures illustrated in FIGS. 1 through 5 and 7 and 8 are used as specific embodiments of the third aspect of the present invention. The explanation made on FIGS. 1 through 5 and 7 and 8 in connection with the embodiments according to the first aspect of the present invention can be applied to the embodiments according to the third aspect of the present invention. However, in the embodiments according to the third aspect of the present invention, as in the SOFC of FIG. 1, the open porosity of the bottom portion 4a of the bottom-provided porous support tube 4 is made smaller than that of the opening end portion 4b of the power generating portion, so that the permeability of the oxidizing gas through the bottom portion 4a is suppressed to a smaller degree as compared with that in the end portion 4b of the power generating portion. This is the same with respect to an SOFC mentioned later in connection with FIG. 13.

FIG. 13 illustrates another embodiment of the SOFC according to the third aspect of the present invention in which an oxidizing gas feeding pipe 61 is made of a porous gas-permeable material, for example, a porous ceramic as the oxidizing gas feeding portion instead of the circular holes or the slits provided on the lateral face of the oxidizing feed pipe, and a closing member 62 is attached to a tip of the oxidizing gas feed pipe 61 on the bottom side for interrupting passing of the gas therethrough. When the oxidizing gas is fed into the oxidizing gas feed pipe 6 under pressure as shown by an arrow A, the oxidizing gas inside the oxidizing gas feed pipe 61 is discharged into the cylindrical space 29 through the lateral face 61b as shown by arrows I to be utilized for the power generation.

Therefore, since the oxidizing gas is fed and mixed together into the cylindrical space through the entire peripheral surface 61b of the oxidizing gas feed pipe 61, the concentration of oxygen inside the cylindrical space 29 can be also made uniform as in the case of the SOFC in FIG. 1 different from the case where the oxidizing gas is fed through the tip opening of the oxidizing gas feed pipe as shown in FIG. 14.

Although the open porosity of the oxidizing gas feed pipe 61 may be made constant at every location, the open porosity of the end portion 61 of the bottom side may be made different from that of the end portion on the opening side of the power generating portion. In that case, it is more effective to make the open porosity of the end portion 61c on the bottom side small and gradually increase the open porosity toward the opening end side in considering that the concentration of the fresh oxidizing gas on the side of the bottom portion 4a is prevented, because the amount of the oxidizing gas to be fed to the side of the bottom portion 4a is decreased, and a feed amount of fresh oxidizing gas to be fed to the side of the end portion 4b of the power generating portion can be relatively increased.

It is preferable that the porous oxidizing gas feed pipe 61 is made of zirconia or alumina. Although the closing member 62 may be made gas-tight, it may be that the closing member is made of a ga permeable material to feed the oxidizing gas from the tip side of the oxidizing gas feed pipe 61.

In order to make the open porosity of the end portion 61c on the side of the bottom portion of the porous oxidizing gas feed pipe 61 smaller and give a gradient to the open porosity, the method similar to those in the case of the above-mentioned porous support tube 4 may be employed.

In addition, the entire oxidizing gas feed pipe 61 is made of a porous material, but only that portion of the oxidizing gas feed pipe 61 which is inserted into the cylindrical space 29 is advantageously made of the porous material, because tee oxidizing gas will not leak outside the cylindrical space 29 in this case.

The above-mentioned embodiments may be modified in various manners. Although the fuel electrode is provided on the outer side of the air electrode 5, this electrode arrangement may be reversed. In this case, the fuel gas is fed to the annular space, and the oxidizing gas is fed outside the SOFC element.

Although the SOFC element 40 is vertically supported in FIG. 1, the entire power generating device may be held horizontally or inclined at a given angle.

Although the circular holes 2, 22 or the slit 12, 32 provided in the lateral face of the oxidizing gas feed pipe 1 are formed as the oxidizing gas feeding portion, an oxidizing gas feeding portion having a different construction may be used. For example, numerous small holes may be provided at random. In this case, if the density of the small holes is increased as the location approaches the bottom portion, effects similar to those in the case of FIGS. 4 and 5 can be obtained.

According to the solid oxide fuel cell of the third aspect of the present invention, since the gas feed portion for feeding the oxidizing gas o the fuel gas to the cylindrical space is provided at least in the lateral face of the gas feed pipe, and fresh oxidizing gas or fuel gas is fed into the cylindrical space through the gas feeding portion at the lateral face and mixed with the gas having its concentration already reduced, the gradient of the concentration of oxygen or the fuel inside the cylindrical space can be made smaller. Further, since the permeating amount of the gas through that portion of the bottom-provided cylindrical porous support tube which faces the upstream side of the stream of the gas flowing through the cylindrical space is made smaller than the gas permeating amount of the gas through that portion which faces the downstream side, the amount of the gas passing through the bottom-provided porous support tube on the upstream side is smaller than that of the gas passing through the bottom-provided porous support tube on the downstream side.

As mentioned above, since the gradient of oxygen or the fuel is made smaller between the upstream side and the downstream side inside the cylindrical space and the gas permeating amount on the upstream side is made smaller than that on the downstream side, the amount of oxygen or the fuel penetrating the bottom-provided porous support tube can be effectively made uniform by the synergistic effects thereof, and non-uniformity of the reaction on the electrode can be corrected. By so doing, the heat generation can be made uniform over the entire bottom-provided porous support tube so that thermal strain and stress can be reduced and occurrence of cracks can be prevented to prolong the use life of the solid oxide fuel cell and further improve the power generating efficiency.

What is claimed is:

1. A solid oxide fuel cell comprising a bottom-provided cylindrical solid oxide fuel cell element including at least an air electrode, a solid electrolyte and a fuel electrode, a gas feed pipe inserted into a cylindrical space of said solid oxide fuel cell element and having a gas feeding portion for feeding an oxidizing gas or a fuel gas into said cylindrical space of said solid oxide fuel cell element, wherein said gas feeding portion is provided at least in a lateral face of the gas feed pipe.

2. The solid oxide fuel cell according to claim 1, wherein said gas feed portion is constituted by one selected from the group consisting of:
   (a) a plurality of circular holes having a same diameter and provided in the lateral face of the gas feed pipe in a longitudinal direction thereof,
   (b) a slit having a slender rectangular shape and provided in the lateral face of the gas feed pipe in a longitudinal direction thereof,
   (c) a plurality of circular holes provided in the lateral face of the gas feed pipe in the longitudinal direction thereof, the diameters of said circular holes being made gradually greater from a side of an opening portion of the solid oxide fuel cell element to a side of a bottom portion thereof,
   (d) a slit provided in the lateral face of the gas feed pipe in the longitudinal direction thereof, a width of said slit being made gradually greater from the side of the opening portion of the solid oxide fuel cell element to the side of the bottom portion thereof, and
   (e) a plurality of gas feeding holes provided in the peripheral side of the gas feed hole, said gas feeding holes being inclined downwardly in a radially outward direction.

3. The solid oxide fuel cell according to claim 1, wherein at least two flat plate-like ribs are axially provided to connect an inner peripheral face of the solid oxide fuel cell element with an outer peripheral face of said gas feed pipe, and said gas feeding portion is provided for each of spaces defined by the inner peripheral face of the cell element, the outer peripheral face of the gas feed pipe and the ribs.

4. The solid oxide fuel cell according to claim 1, wherein said air electrode is constituted by a plurality of air electrodes formed on an outer peripheral surface of a bottom-provided cylindrical porous support tube at plural stages at a given interval in a longitudinal direction thereof, the solid electrolyte and the fuel electrode are successively formed on each of the air electrodes in this order, and the fuel electrode is electrically connected to the air electrode on one of adjacent sides through an interconnector.

5. A solid oxide fuel cell comprising a porous cylindrical support tube, and an air electrode, a solid electrolyte and a fuel electrode formed on an outer peripheral surface of the support tube, said cell being adapted to feed a stream of gas into a cylindrical space of said porous cylindrical support tube for generation of power, wherein a permeating amount of the gas through that portion of the porous cylindrical support tube which faces an upstream side of a stream of the gas flowing through the cylindrical space is made smaller than that of the gas through that portion of the porous cylindrical support tube which faces a downstream side of the gas stream.

6. The solid oxide fuel cell according to claim 5, wherein an open porosity of the porous cylindrical support tube is made smaller o the upstream side of the gas than on the downstream side.

7. The solid oxide fuel cell according to claim 6, wherein the open porosity of the porous support tube is in a range of 20-50% at every location thereof.

8. The solid oxide fuel cell according to claim 7, wherein a diameter of pores of the porous support tube is in a range of 1-10 $\mu$m.

9. The solid oxide fuel cell according to claim 6, wherein a difference in the open porosity between a bottom portion and an end portion on an opening side of a power generating portion of the porous support tube meets the following relations: when $1.0 \leq x \leq 2.2$, $2.3 \times 2 - 1.2 \leq y \leq 3.4 \times 2 - 1.7$, and when $2.2 < x \leq 3.0$, $x^2 + 5.1 < y \leq 1.5$ in which x is the length (m) of the support tube, and y is the difference (%) in the open porosity between the bottom portion and the open end portion.

10. The solid oxide fuel cell according to claim 6, wherein the porous cylindrical support tube is opened at opposite ends, the air electrode is formed on the entire outer peripheral surface of the support tube, an interconnector is provided on a part of an outer peripheral surface of the air electrode in an entirely axial direction, the solid electrolyte is provided on the other part of the outer peripheral surface of the air electrode such that the solid electrolyte is connected to the interconnector, the fuel electrode is provided on the outer peripheral surface of the solid electrolyte, and a connection terminal is provided on an outer peripheral surface of the interconnector in an axial direction thereof.

11. A solid oxide fuel cell comprising a solid oxide fuel cell including a bottom-provided cylindrical porous support tube, and an air electrode, a solid electrolyte and a fuel electrode formed on an outer peripheral surface of said porous cylindrical porous support tube, and a gas feed pipe inserted into a cylindrical space of said solid oxide fuel cell element, wherein a gas feeding portion is provided at least in a lateral face of said gas feed pipe for feeding an oxidizing gas or a fuel gas into said cylindrical space, and a permeating amount of gas passing through that portion of said bottom-provided cylindrical porous support tube which faces an upstream side of a stream of the gas passing through the cylindrical space is made smaller than that of the gas passing through that portion of the bottom-provided cylindrical porous support tube which faces a downstream side of said gas stream.

12. The solid oxide fuel cell according to claim 11, wherein said gas feed portion is constituted by one selected from the group consisting of:
 (a) a plurality of circular holes having a same diameter and provided in the lateral face of the gas feed pipe in a longitudinal direction thereof,
 (b) a slit having a slender rectangular shape and provided in the lateral face of the gas feed pipe in a longitudinal direction thereof,
 (c) a plurality of circular holes provided in the lateral face of the gas pipe in the longitudinal direction thereof, the of said circular holes being made gradually greater from a side of an opening portion of the solid oxide fuel cell element to a side of a bottom portion thereof,
 (d) a slit provided in the lateral face of the gas feed pipe in the longitudinal direction thereof, a width of said slit being made gradually greater from the side of the opening portion of the solid oxide fuel cell element to the side of the bottom portion thereof,
 (e) a plurality of gas feeding holes provided in the peripheral side of the gas feed hole, said gas feeding holes being inclined downwardly in a radially outward direction, and
 (f) said gas feed pipe being a porous gas-permeable material, a tip of a bottom portion of gas feed pipe being closed with a closing member to prevent passing of the gas.

13. The solid oxide fuel cell according to claim 11, wherein at least two flat plate-like ribs are axially provided to connect an inner peripheral face of the solid oxide fuel cell element with an outer peripheral face of said gas feed pipe, and said gas feeding portion is provided for each of spaces defined by the inner peripheral face of the cell element, the outer peripheral face of the gas feed pipe and the ribs.

14. The solid oxide fuel cell according to claim 11, wherein said air electrode is constituted by a plurality of air electrodes formed on an outer peripheral surface of a bottom-provided cylindrical porous support tube at plural stages at a given interval in a longitudinal direction thereof, the solid electrolyte and the fuel electrode are successively formed on each of the air electrodes in this order, and the fuel electrode is electrically connected to the air electrode on one of adjacent sides through an interconnector.

15. The solid oxide fuel cell according to claim 11, wherein an open porosity of the porous cylindrical support tube is made smaller on the upstream side of the gas than that on the downstream side.

16. The solid oxide fuel cell according to claim 15, wherein the open porosity of the porous support tube is in a range of 20-50% at every location thereof.

17. The solid oxide fuel cell according to claim 11, wherein a diameter of pores of the porous support tube is in a range of 1-10 μm.

18. The solid oxide fuel cell according to claim 11, wherein a difference in the open porosity between a bottom portion and an end portion on an opening side of a power generating portion of the porous support tube is not more than 15% in a case of a distance between the bottom portion and the power generating portion being 3,000 mm.

* * * * *